(12) United States Patent
Fellenberg et al.

(10) Patent No.: US 8,156,780 B2
(45) Date of Patent: Apr. 17, 2012

(54) METHOD AND DEVICE FOR CUTTING HIGH-TENSILE SHEET METAL, AND PRESS

(75) Inventors: Stefan Fellenberg, Berlin (DE);
Juergen Fahrenbach, Aichelberg (DE);
Hans-Joerg Schaller, Vaihingen (DE)

(73) Assignee: nanoferenz GmbH, Berlin (DE)

( * ) Notice: Subject to any disclaimer, the term of this patent is extended or adjusted under 35 U.S.C. 154(b) by 971 days.

(21) Appl. No.: 11/569,874

(22) PCT Filed: May 12, 2005

(86) PCT No.: PCT/DE2005/000869
§ 371 (c)(1),
(2), (4) Date: Apr. 7, 2008

(87) PCT Pub. No.: WO2005/120741
PCT Pub. Date: Dec. 22, 2005

(65) Prior Publication Data
US 2008/0196471 A1    Aug. 21, 2008

(30) Foreign Application Priority Data

Jun. 2, 2004 (DE) .................. 10 2004 027 017
Jul. 19, 2004 (DE) .................. 10 2004 034 775

(51) Int. Cl.
*B21D 43/28* (2006.01)
*B21D 31/00* (2006.01)
*B26D 7/14* (2006.01)

(52) U.S. Cl. ................. 72/324; 72/378; 83/17

(58) Field of Classification Search ........... 72/324, 72/338, 339, 294, 335, 378; 83/17, 20, 21, 83/176
See application file for complete search history.

(56) References Cited

U.S. PATENT DOCUMENTS

| 2,290,743 | A | | 7/1942 | Ernst | |
|---|---|---|---|---|---|
| 2,293,721 | A | * | 8/1942 | Engler | 83/20 |
| 4,156,377 | A | | 5/1979 | Bracewell | |
| 4,854,202 | A | * | 8/1989 | McNab et al. | 83/176 |
| 5,105,696 | A | | 4/1992 | Baubles | |
| 5,253,558 | A | * | 10/1993 | Guddal, Jr. | 83/18 |
| 6,041,639 | A | * | 3/2000 | Pacher et al. | 72/294 |

FOREIGN PATENT DOCUMENTS

| DE | 2804185 A1 | 8/1978 |
|---|---|---|
| DE | 2729047 A1 | 1/1979 |
| DE | 2808091 A1 | 8/1979 |
| DE | 19639220 A1 | 3/1998 |
| DE | 10252625 A1 | 5/2003 |
| EP | 0475923 A1 | 3/1992 |
| FR | 2690097 A1 | 10/1993 |
| GB | 923811 | 4/1963 |
| WO | 2005120741 A3 | 12/2005 |

* cited by examiner

*Primary Examiner* — Teresa Ekiert
(74) *Attorney, Agent, or Firm* — Jerry Turner Sewell

(57) ABSTRACT

In a method of cutting high-tensile workpieces, in particular sheet metals of martensite steel, the workpiece is subjected to a bending stress prior and during a shearing process. The bending stress causes a substantial component of a tensile force transverse to a desired cutting contour. Tensile stresses are superimposed to the shearing stresses, which favor the beginning of the workpiece separation. The bending stress is preferably selected so that the resulting tensile stress exists at a side facing the cutting tool.

5 Claims, 13 Drawing Sheets

Fig. 12a
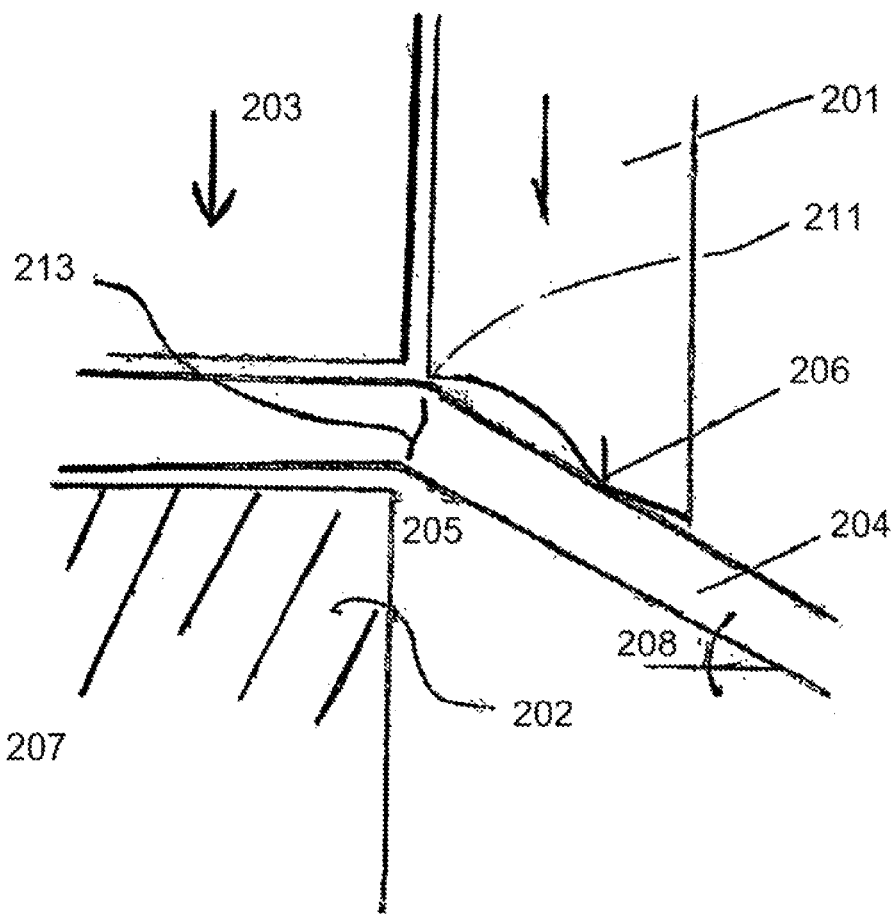
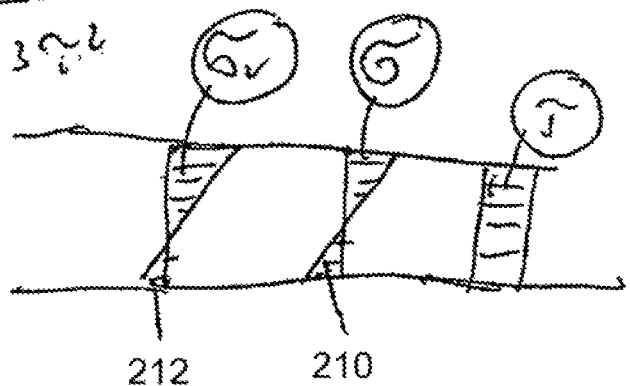
Fig. 12b
Fig. 12c

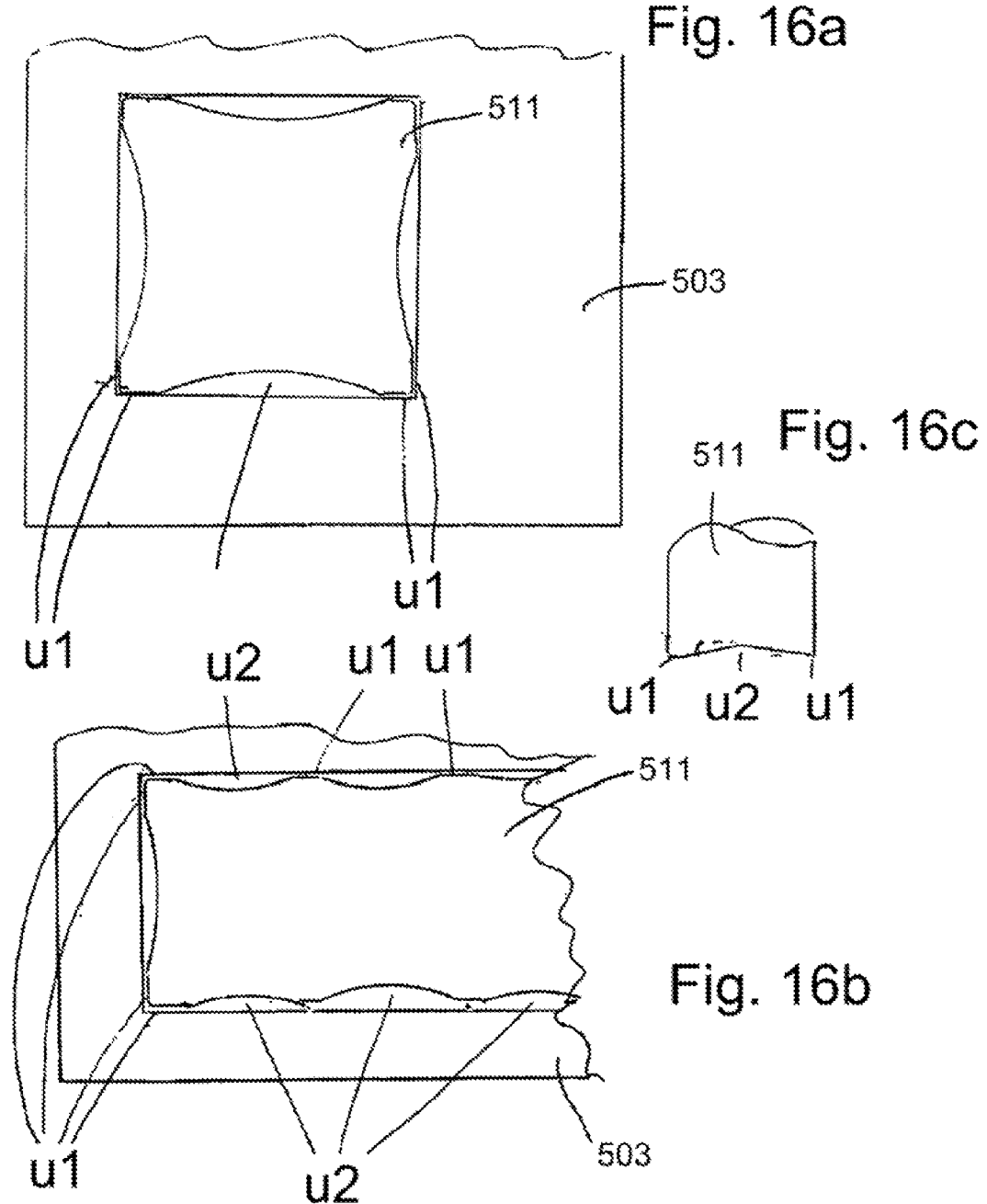

2-Stage Combination-Cylinder
Holding-Down Device Diameter 100 mm
Ejector Diameter 50 mm

METHOD AND DEVICE FOR CUTTING HIGH-TENSILE SHEET METAL, AND PRESS

BACKGROUND OF THE INVENTION

The various embodiments of the invention described herein relate to a method and device for cutting high-tensile sheet metal, and a press.

In practice, it is increasingly an objective to separate high-tensile sheet metals that are only a little ductile, or not at all, in particular (martensite) hardened sheet metals (sheet steels), by means of shearing. For example, this is necessary during the manufacture of high-tensile automotive body parts, which are increasingly used. In practice, laser cutting installations are preferably used to separate such high-tensile sheet metals. However, these installations have a limited productivity.

The attempt to separate such (martensite) hardened sheet metals along predetermined cutting contours by means of punching tools results in extreme wear and tear at the cutting edges of the punching tool. Furthermore, the resulting cutting edges are often imprecise and rough. This disadvantage does not exist when the cutting is performed using laser cutting installations, however, the integration of laser cutting installations into reshaping tools for automotive body parts is at least difficult. Further, reshaping installations, such as step presses set the pace so that only a very short time period is available for performing the cutting processes.

Therefore, it is an objective of the invention to provide a fast and reliable method of cutting high-tensile sheet metals that provides for an improved lifetime of the used cutting tools.

SUMMARY OF THE INVENTION

Accordingly, one aspect involves a method of cutting high-tensile workpieces, in particular sheet metals of martensite steel, wherein the workpiece is subjected to a bending stress prior and during a shearing process, and wherein the bending stress causes a substantial component of a tensile force transverse to a desired cutting contour.

A further aspect involves an apparatus for bending cutting of a workpiece, having a support surface for supporting the workpiece, which has an edge adjusted to the desired cutting contour, a cutting knife having a cutting edge adjusted to the cutting contour, and a bending device. The bending device is provided at a lateral distance to the cutting contour and configured to load the workpiece with a bending moment and thereby with a tensile stress in the area of the cutting contour before the cutting knife penetrates the workpiece.

The method according to the invention is based on a conventional shearing process, in which a workpiece is separated by means of introduction of a sufficiently high shearing stress. According to the invention tensile stresses are superimposed to the shearing stresses, which favor the beginning of the workpiece separation. This tensile stress, or a component of the tensile stress, acts transverse to the desired line of bending to be generated. The tensile stress is caused by means of a bending stress of the workpiece. Thereby, the bending stress is preferably selected so that the resulting tensile stress exists at a side facing the cutting tool.

Through the simultaneous loading of the workpiece to be separated by means of bending stress and shear stress the forming of a separation plane in the workpiece to be separated is substantially aided. A dramatic reduction of the cutting forces as well as a dramatic reduction of the wear and tear of tools results while at the same time improving the quality of the cutting areas.

Preferably, the bending momentum is set at such a high value that the tensile stress does not yet reach the break limit of the material to be separated. For such a biased material a relatively low shearing stress suffices to start and perform the separation process.

In a preferred implementation and realization of the invention a sheet metal section on a side of the cutting contour is firmly clamped between a holding-down device and a support surface. The firmly clamped part of the sheet metal is preferably the usable part while the non-clamped part extending beyond the cutting line is preferably the waste piece. The holding-down device is thereby preferably loaded with such a high holding-down force so that the tensile stress introduced into the sheet metal through the bending is drastically reduced in direct vicinity of the cutting contour. It turned out that it is suitable if the ratio between the edge of the holding-down device and the thickness of the sheet metal is about 6.

The bending of the sheet metal before performing the actual separation process can occur immediately before performing the cutting process. For that purpose, the actual cutting tool can have a projection that touches the sheet metal during the cutting process shortly before the cutting edge of the cutting tool touches the sheet metal. In that case, the distance of the projection from the cutting edge and the time advance with respect to the cutting edge are selected so that the tensile stress in the sheet metal to be separated has at the cutting contour not yet reached the flow stress that is typical for the sheet metal when the cutting edge touches the sheet metal. For that purpose, it turned out as suitable if the distance between the cutting edge and the projection is in a range, which is adjusted to the thickness of the sheet metal and the size of the projection.

Alternatively, it is possible to implement the pre-bending device separate from the cutting knife. This can be done, for example, with an additional element, which is movable independent from the cutting knife. This element can be used prior to commencing the shearing process for introducing a suitable bending stress and, hence, tensile stress, into the sheet metal. The element in question can be moved in a position-controlled manner as well as in a force-controlled manner. In the first case, it can pre-bend the sheet metal and, then, remain in this position, while the cutting knife separates. Alternatively, the location, i.e., the position of the respective biasing element, can be changed in a controlled manner during the cutting process of the cutting knife.

In the case of the controlled providing of a force, the pre-bending element is hydraulically adjustable on a case-by-case basis. It is then possible to maintain the pre-bending force constant during the cutting process, or to vary it according to a predetermined time profile, or a profile depending on the position of the cutting knife. All mentioned parameters can be used to optimize the lifetime of tools and the quality of the separation plane to be caused.

The suitable process can be used in a separate shearing installation as well as in a punching installation, or as part of another forming tool. Accordingly, the apparatus can be implemented as a shearing installation, a punching installation or a part of a forming tool, for example, within a step press for sheet metals.

When punching thick sheet metals, forces act between the push-rod and the punching tool that vary greatly over time. As long as the material of the workpiece resists the punch a very high force exists, whereby parts of the press are elastically deformed. This concerns the press table, the punching tool, the press supports, the press head piece and, to a certain extent, also the push-rod along the crankshaft and eccentric shaft. When the workpiece gives in under the influence of the punch, the energy stored elastically in the mentioned elements is released in an uncontrolled manner. To better control that the punch suddenly breaks through the workpiece, DE 102 52 625 A1 proposes a system for reducing the cutting punch, in which the tool includes a number of hydraulic cylinders. These can be positioned below, above or on a side of the workpiece. Sensors, such as ultrasound sensors, or sensors that measure the flow speed of the hydraulic fluid flowing out of the hydraulic cylinders, close a valve through which up to now the hydraulic fluid could flow out of the hydraulic cylinders. The hydraulic cylinders are coupled to pressure accumulators, which are under relatively high pressure. Therefore, they generate a high counter force. The force of the punch, which so far has been acting upon the workpiece, is transferred to the hydraulic cylinders when the punches begin to break through the workpiece.

This approach to the dampening of the cutting shock has been proven true in principle. However, adjusting the sensors for detecting the break through of the workpiece is critical. Further, in an arrangement of the hydraulic cylinders next to the tool a certain cutting shock still exists that is to be reduced further.

Another aspect involves a press, in particular for punching sheet metals, having a press support to which a press table for holding a lower tool belongs, and in which a push-rod is movably mounted that is in communication with a drive device and carries an upper tool. The press has a controllable sheet metal holding device, which belongs to the tool and presses the workpiece against the lower tool during the forming process, and which, therefore, supports itself with its other end against the workpiece. A control device is assigned to the sheet metal holding device and influences the force exerted by the sheet metal holding device and acts between the push-rod and the workpiece.

This objective is achieved with the press according to claim 20 as well as claim 30:

The press has a device for holding a sheet metal, which presses the tool during the forming process against the lower tool. The lower tool is, for example, a punching tool while the upper tool is, for example, a die. The device for holding a sheet metal is capable of exerting different forces. A control device assigned to the device for holding a sheet metal can influence the force exerted by the sheet metal holding device.

Usually, the sheet metal holding device includes a holding-down plate, which supports itself against the workpiece. The holding-down plate extends to the immediate neighborhood of the dies (punch dies), and, hence, close to the cut to be made. Thereby, the sheet metal is to be clamped tightly in immediate vicinity of the cut between the holding-down plate and the support tool (punching tool) to achieve a high cutting quality. In the press according to the invention, the sheet metal holding device receives, after the dies break through the workpiece, the force exerted by the push-rod, while it passes through its lower dead center, and temporarily stores the energy released thereby by the push-rod.

During the return stroke of the push-rod this energy is transferred back to the push-rod, and, therefore, to the drive of the press. Due to the achieved avoidance of the uncontrolled release of the energy elastically stored in the press, the drive of the press as a whole is unburdened, i.e., energy is preserved. Further, the mechanical stress on the press is reduced due to the avoidance of too high a force and sudden changes of force. In addition, the transfer of the force, which is exerted onto the dies up to the breaking through of the workpiece, to the device for holding sheet metals achieves a particularly strong clamping of the workpiece particularly during the break through so that particularly good cutting qualities result. Furthermore, the force can be introduced into the workpiece via the device for holding sheet metals across a particularly large area, and, hence, in a careful manner so that undesired deformations of the workpiece, such as crushing or similar, can be avoided.

In one embodiment, the press enables achieving high stroke rates. In the event that the moment the push-rod breaks through the workpiece is recognized, i.e., the moment the workpiece gives in, for example, by monitoring the volume flow of hydraulic fluid released by support devices having hydraulic cylinders, a steep increase of the volume flow occurs the moment the workpiece breaks through. However, the thereby resulting volume flow can actually be below a value, which occurs at high stroke rates when the push-rod reaches the support device, which can be implemented as a device for holding sheet metals. According to the invention, therefore, the control device releases the control of the force provided by the support device only within a predetermined path length of the movement of the push-rod. In this way, errors, which otherwise would lead to a severe malfunction of the press, are safely excluded.

The predetermined path length advantageously has an adjustable start $\phi 1$ or $x1$. Further, it can advantageously have a variably adjustable end $\phi 2$ or $x2$. Further, its length can be variable and adjustable.

This allows the press to be adjusted in a simple way to different situations, in particular with respect to the processing speed, or the number of strokes, and the thickness of the sheet metal.

Advantageously, the device for holding sheet metals or the support device has a hydraulic cylinder that is coupled to a first and a second hydraulic pressure accumulator. Both pressure accumulators have, for example, a movably supported piston having a damped end stop. In the alternative, accumulator devices with membranes may be provided, or storage devices, in which a gas pressure buffer is in direct contact with the hydraulic fluid. Advantageously, both pressure accumulators have different static pressures. The path leading from the hydraulic cylinder to the pressure accumulator having a lower pressure is advantageously regulated by a valve that monitors the fluid flow, i.e., the mass flow, and shuts it down when it exceeds a threshold value. This flow-sensitive valve is an advantageous embodiment of a sensor device for detecting the break through of the workpiece. It indicates when a velocity threshold value of the relative movement between the upper tool (die) and the workpiece is exceeded. Alternative sensor systems can be used, such as acceleration sensors at the push-rod or the die, distance sensors that detect the movement of the push-rod and output a corresponding time-varying signal. The rate of the signal's change is then determined and used as an indicator for the pressing break through.

Further, a corresponding device for measuring the distance, or other sensor device can be used for generating a signal, which is then used for setting a trigger window, within which the break through can be expected. Monitoring for detecting the break through occurs then only during this trigger window, while outside this trigger window the support device is passive, or the device for holding the sheet metal exclusively performs its function of holding sheet metals.

BRIEF DESCRIPTION OF THE SEVERAL VIEWS OF THE DRAWINGS

Further details of advantageous embodiments of the invention are illustrated in the drawings, the description and the claims. In the drawings, embodiments of the invention are depicted. In the drawings:

FIG. 12A-C shows apparatus for cutting high-tensile sheet metal.

FIG. 16A-C illustrates schematically a die; and

DETAILED DESCRIPTION OF THE INVENTION

Figure 1:
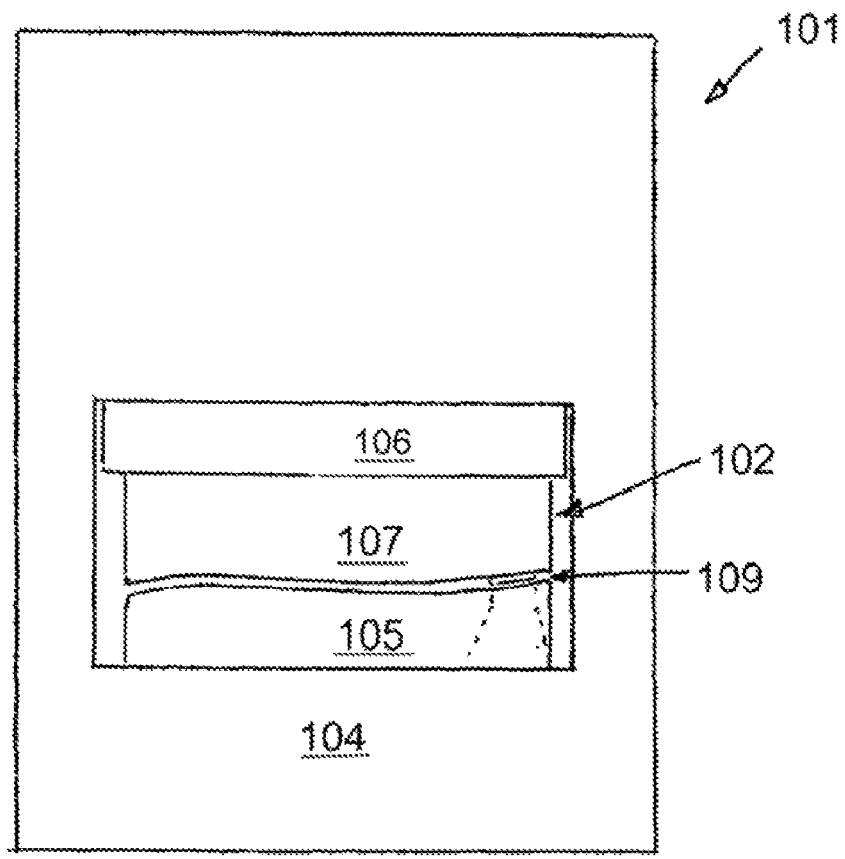
FIG. 1 shows a schematic front view of a sheet metal step press.

FIG. 1 illustrates a step press 101 for forming sheet metal parts with respect to a tool 102 provided for that purpose. The tool 102 is for performing at least one separating process and eventually for additional forming processes. Further, the step press 101 can include additional tools, wherein the workpiece 103 (schematically illustrated in FIG. 2) is then handed from one tool to the other. A transfer device provided for that purpose is not shown.

The tool 102 has a lower tool mounted stationary on a press table 104, and an upper tool 107 mounted to the push-rod 106 of the press. The tool 102 opens and closes in accordance with the work cycle of the press, wherein each time one workpiece is processed. When the tool 102 closes, the upper tool 107 touches the lower tool 105.

Figure 2:
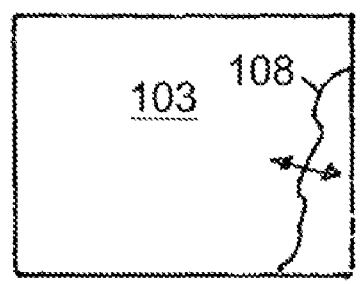
FIG. 2 is a top view of a schematically depicted workpiece.
Figure 3:
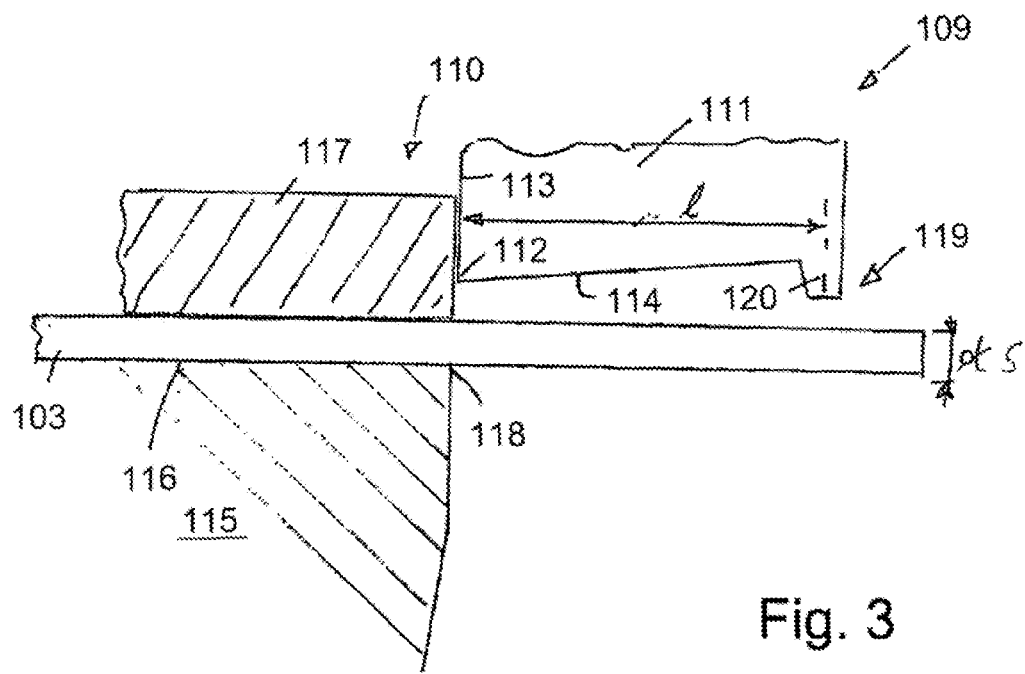
FIGS. 3 to 4 show a tool for separating sheet metal parts for the step press according to FIG. 1 in a schematic vertical cross sectional illustration in various process stages during separating the sheet metal.
Figure 4:
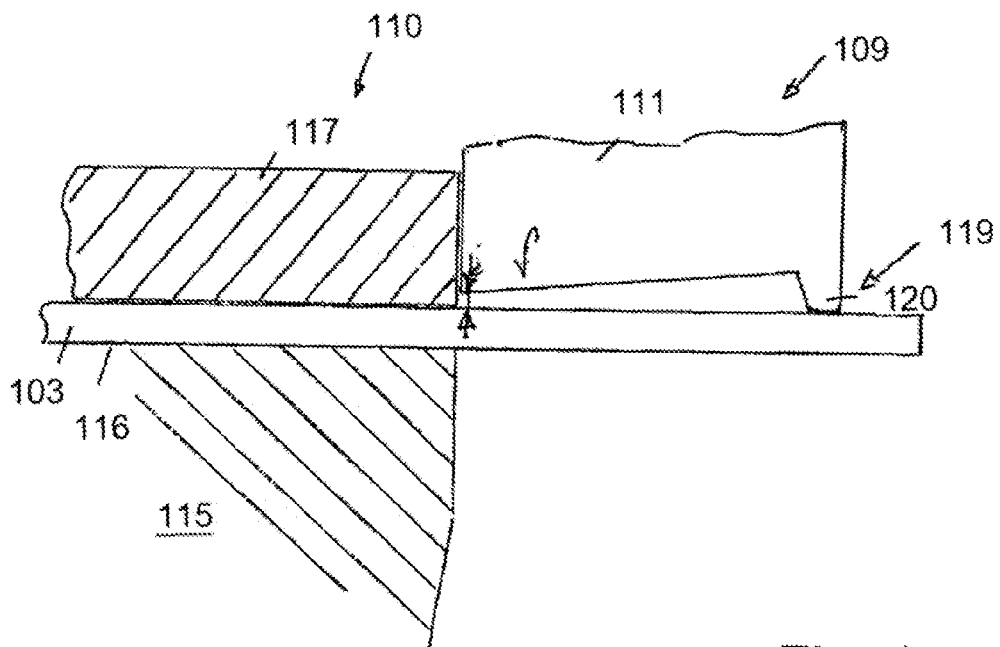

During the processing of the workpiece 103 a cutting process needs to be performed on it, namely along a cutting contour 8 schematically illustrated in FIG. 2. The contour can be limited in a straight or curved line. Due to performing the cutting process, the tool 102 has a cutting device 109, as shown in FIG. 3. A tool-clamping device 110 and a cutting knife 111 belong to it. The cutting knife 111 can be referred to as cutting die. It is mounted stationary to the upper tool 107, or is a part of it. A cutting edge 112 is provided on the cutting knife 111 that determines the form of the cutting contour 108 and corresponds to it. The cutting edge 112 is limited by two surfaces 113 114, which are preferable positioned to each other at an angle of a little less than 90°, i.e., an acute angle.

The device 110 for clamping the workpiece is formed by a workpiece support 115 with a surface 116 facing the workpiece 103, as well as a sheet metal holder 117. The workpiece support 115 is coupled to the lower tool 105, or is a part of it. It ends at the cutting contour with a corresponding edge 118, at which the bordering surfaces form a right angle or a somewhat acute angle with each other. The sheet metal holder 117 is supported by the upper tool 107 and biased against the workpiece 103 by means of, for example, a hydraulic biasing device. During lowering the upper tool 107 the sheet metal holder 117 touches the workpiece 103 before the cutting knife 111 touches the workpiece 103. Thereby, the sheet metal holder 117 presses the workpiece 103 strongly against the support surface 116.

To the cutting apparatus 109 belongs further a pre-bending device 119, which serves and is configured for providing a bending load to the workpiece 103 before and eventually during the performance of the cutting process. The pre-bending device 119 is in its simplest embodiment, as illustrated in FIGS. 3 to 6, formed by a protrusion 120, which is formed at the cutting knife 111, or a cutting die protruding towards the workpiece 103. It extends beyond the surface 114 and the cutting edge 112 towards the workpiece 103 to such an extent that it touches the workpiece 103 before the cutting edge 112. The protrusion 120 is preferably a rib provided at a predetermined distance a to the cutting edge 112. Preferably, the protrusion 120 has the same height h along its length, wherein the height h, as indicated in FIG. 1, is measured with reference to the cutting edge 112 or a plane that is arranged parallel to the support surface 116 and defined by the upper side of the workpiece 103, on which the cutting edge 112 rests in FIG. 3.

The ratio of the distance a (l) to the height h (s) is preferably six times the thickness d of the sheet metal.

The protrusion 120 must not necessarily be configured as a rib. It is also possible to provide a number of individual protrusions. Further, they can be individually adjustable in height to allow suitable adjustments depending on the specific form of the cutting contour 108. For example, it can be suitable to set a different height h in areas in which the cutting contour 108 has a more narrow curvature.

The tool described so far works as follows:

During a cutting process the upper tool 107 moves towards the lower tool 105. Then, the sheet metal holder 117 touches the workpiece 103 and presses it with great force against the surface 116. Between the sheet metal holder 117 and the area 113 of the cutting knife 111 a small gap remains, which ideally corresponds approximately to the cutting gap defined between the edge 118 and the area 113 of the cutting knife 111.

Figure 7:
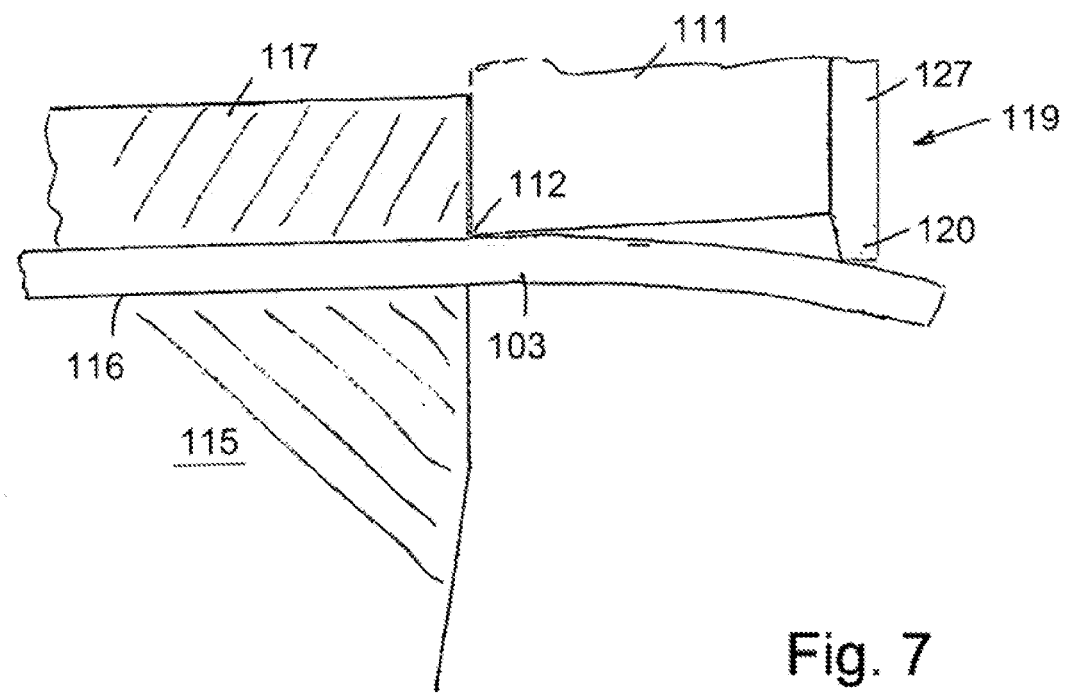
Figure 8:
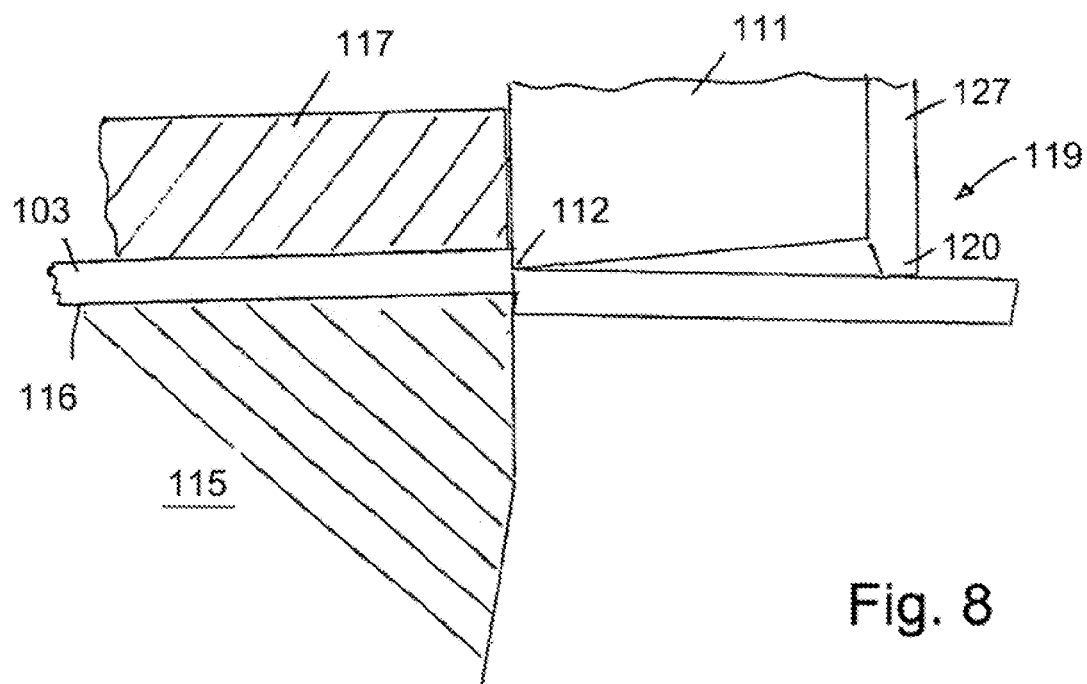

While the sheet metal holder 117 rest on the workpiece 103 the upper tool 107 moves further down. Then, the protrusion 120 touches the workpiece 103 and bends it during its further downward movement. Due to this bending a high bending stress results, in particular directly next to the sheet metal holder 117, i.e., in the area of the cutting contour to be created. With further downward movement of the cutting knife 111 the tensile stress increases, however, without reaching the flow limit of the material. Then, as illustrated in FIG. 7, the cutting edge 112 touches the upper side of the workpiece 103 and begins to apply a shearing stress to it. This results together with the already initiated tensile stress in a comparative tension that leads to the separation of the material. This is illustrated in FIG. 8. With the beginning of the separation process the so far bent section of the sheet metal relaxes again.

Figure 9:
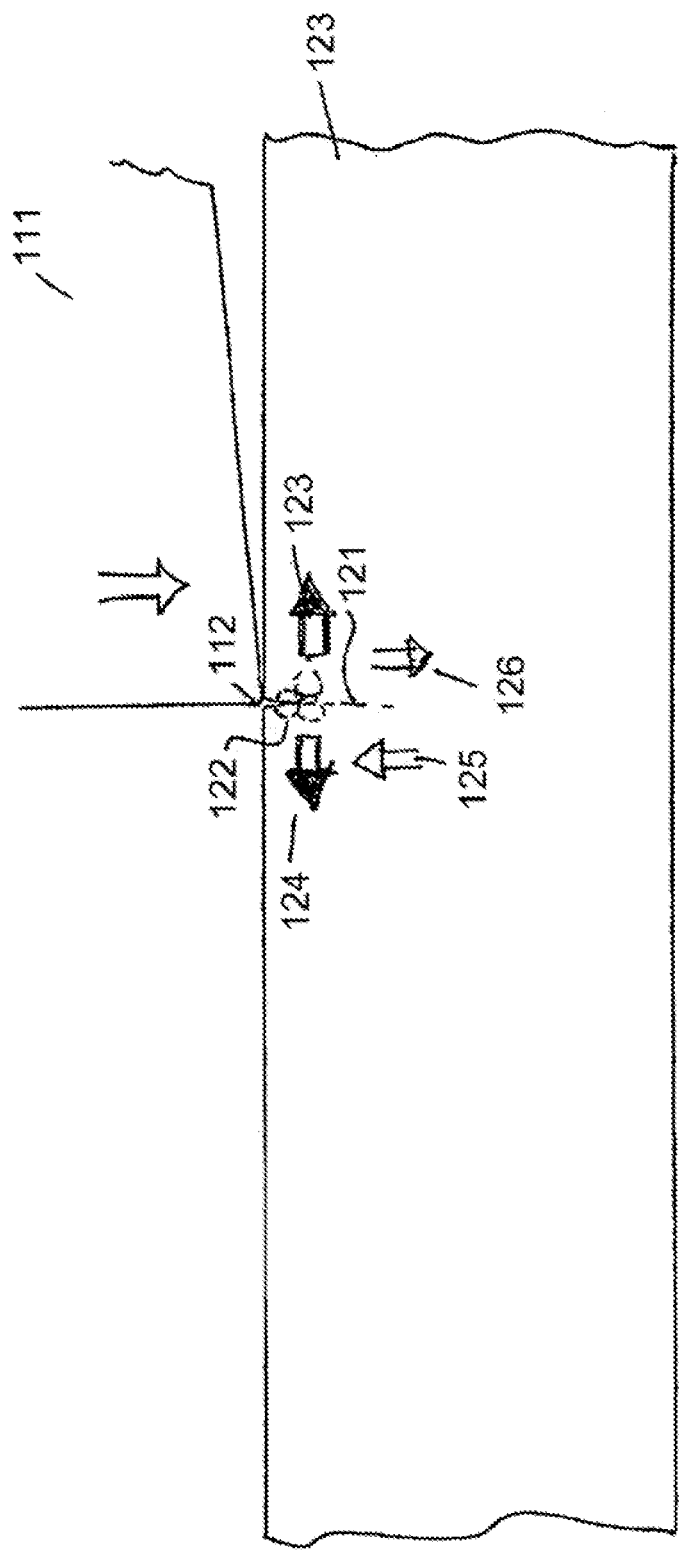
FIG. 9 shows the tool during the separation process in an enlarged, sectional and schematic illustration.

The cutting process described hereinbefore coincides with weak forces at the cutting edge 112 and with little wear and tear of the tool. High qualities of separation or cutting surfaces are achieved. The resulting separation plane 121 can cut through individual grains or crystallites 122 of the workpiece 103, as shown in FIG. 9. This is possible because of the loading with very high tensile stresses, indicated in FIG. 9 through arrows 123, 124, which are preferably higher than the introduced shearing stresses (arrows 125, 126). This leads to very smooth cutting or fractured surfaces.

Figure 5:
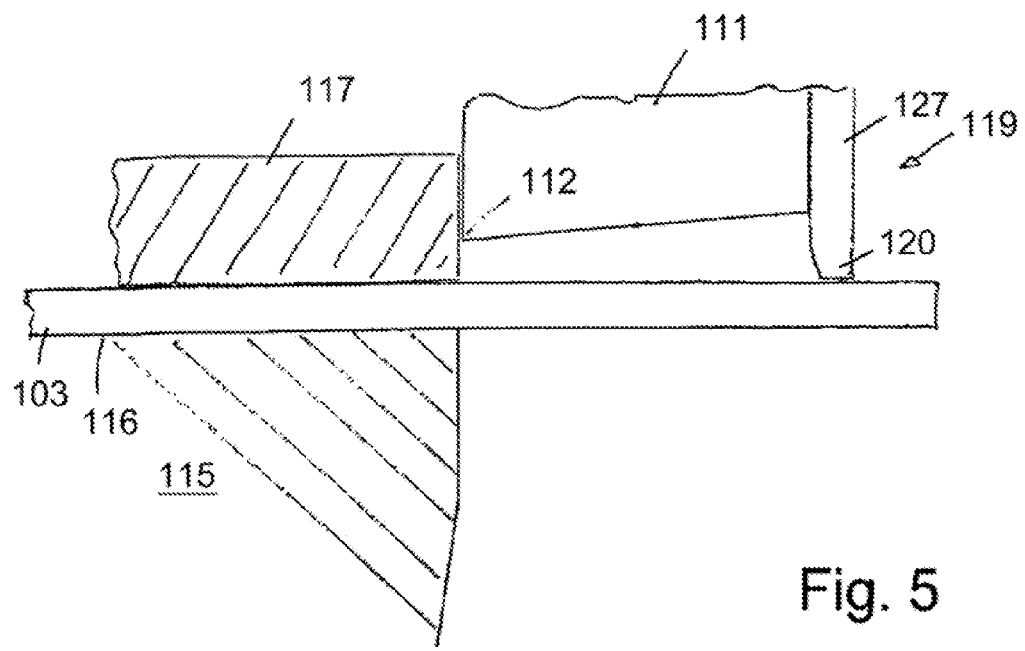
FIGS. 5 to 8 show an alternative embodiment of the tool for the step press according to FIG. 1 in a schematic vertical cross sectional illustration in various process stages.
Figure 6:
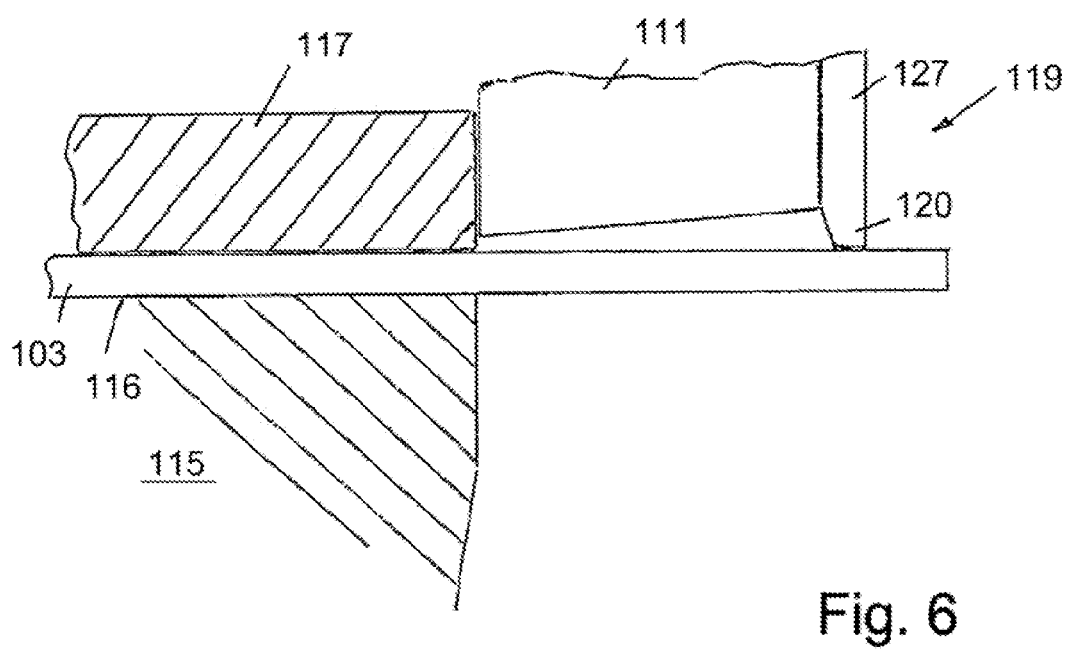

FIGS. 5 to 8 illustrate a more detailed embodiment, wherein the cutting knife 111 and the pre-bending apparatus 119 are configured to be independent of each other, or separate. The pre-bending apparatus 119 is formed by a separate biasing element 127, which is arranged in vicinity of the cutting knife 111 and at a distance to its cutting edge 112. The biasing element 127 can, for example, be connected with a biasing device with the upper tool 107. For example, the biasing device can be a hydraulic cylinder under a predetermined pressure that biases the biasing element 127 with a defined load to bend, i.e., to preload, the workpiece 103 in a defined manner. The workflow is then as follows:

After the placing the sheet metal holder 117 and its tensioning towards the workpiece 103, the pre-bending element 119 touches the workpiece 103, as illustrated in FIG. 5. While the upper tool 107, and with it the cutting knife 111, moves further towards the workpiece 103 the biasing device assigned to the biasing element 127 builds up a force. This phase is illustrated in FIG. 5, in which the workpiece 103 is not yet substantially bent.

At the latest, when the cutting edge 112 touches the workpiece 103, as illustrated in FIG. 7, the biasing element 127 provides the necessary biasing force to bend or bias the workpiece 103 right before the flow limit of the material. The shearing off, as illustrated in FIG. 8, occurs then with an even lower shearing force in that the cutting knife 111 penetrates the material of the workpiece 103 at the cutting edge 112 and introduces a shearing stress.

As in the embodiment described in the foregoing, here, the majority of the tension required for separating the material is provided by the pre-bending device 119, while the lesser share of the material tension is introduced by the cutting knife 111. The contribution of the pre-bending device 119 to the comparison tension σv is thereby greater than the contribution of the cutting knife 111. It is:

$$\sigma v = \sqrt{\sigma^2 + 3\tau^2}$$

wherein σv is the comparison tension, σ the tensile stress, τ the shearing stress, and wherein $3\tau^2 < \sigma^2$.

If the tensile stress exceeds the flow limit it can disadvantageously result in micro cracks in the material. As a precaution, one does not set the break limit, but the flow limit.

As an alternative to the embodiment described with reference to FIGS. 5 to 8, it is also possible to modulate the force provided by the element 127 during the cutting process, i.e., to influence it in a controlled manner depending on a set function of time, or a set position of the cutting knife 111. Thereby, the quality of the cut can be further influenced. For example, it is possible to substantially reduce the bending force after the separation process has been introduced. It is further possible to use specific increasing and decreasing forces, or to vary the bending force along the desired cutting contour 108. For example, the bending force can be set to be greater in concave areas of the cutting line than in convex areas of the cutting line, or other profiles may be applied.

A method according to the invention for cutting high-tensile, in particular non ductile sheet metals, in particular sheet steels, is a combination of a breaking process and a cutting process. In this process, the material to be separated is biased nearly up to its flow limit, and is, then, subjected to a cutting process. A substantially increased lifetime of the tool results together with a substantially improved surface quality of the separation surface compared to pure breaking or pure cutting processes.

FIG. 12a describes an apparatus for cutting high-tensile sheet metals, also referred to as bending cutting. FIG. 12b illustrates an equation of the hypotheses of the change of structure. FIG. 12c pictorially illustrate bending stress and remaining tension.

State of the art: Sheet metals are cut in die plates by means of cutting apparatuses and presses having cutting dies. With high-tensile, in particular martensite hardened sheet metals, an extreme wear and tear results at the cutting edges when using conventional cutting structures.

The disadvantages of the existing technique are solved in that the cutting die is provided with a chamfer whose task is, before the cutting edge sets down for shearing, to pre-bend the sheet metal up to the break limit under tensile stress, and then only to shear by means of providing a little push. The cutting structure by means of the push has the task to exactly cut the sheet metal precisely at the predetermined line. The shear fracture as such is virtually assisted by a predetermined bending pre-stress. From the hypotheses of the change of structure, the comparative tension is the root of the bending stress squared, added with three times the shearing stress squared. That means that the shear stress is significantly improved by the bending shearing. Experiments have shown that this system allows handling of even complex cuts using lasting knives. FIG. 12a shows the cutting structure for controlled bending cutting. The elements of FIGS. 12a, 12b and 12c are identified in the following list:

201 Cutting die, cutting knife
202 Cutting matrix
203 Holding-down device
204 Sheet metal
205 Bonding edge
206 Cut
207 Die plate
208 Bending Angle
209 Bending Stress
210 Equation of hypotheses of the change of structure
211 Break by push
212 Remaining tension with remaining push
213 Shearing stress, remaining break The illustrated devices and methods cut high-tensile, nearly non-ductile sheet metals with a reduced required cutting force, characterized in that the sheet metal is biased, prior to the shearing, by a pre-bending stress provided by applying a bending edge, wherein the cutting die or the cutting knife are provided with a chamfer for pre-bending, wherein the pre-bending is provided by a separate pre-bending rail, wherein the die is slightly negatively dressed to size, wherein a contact edge is maintained at a defined distance, wherein the contact edge is concave with respect to the cutting edge.

Figure 10:
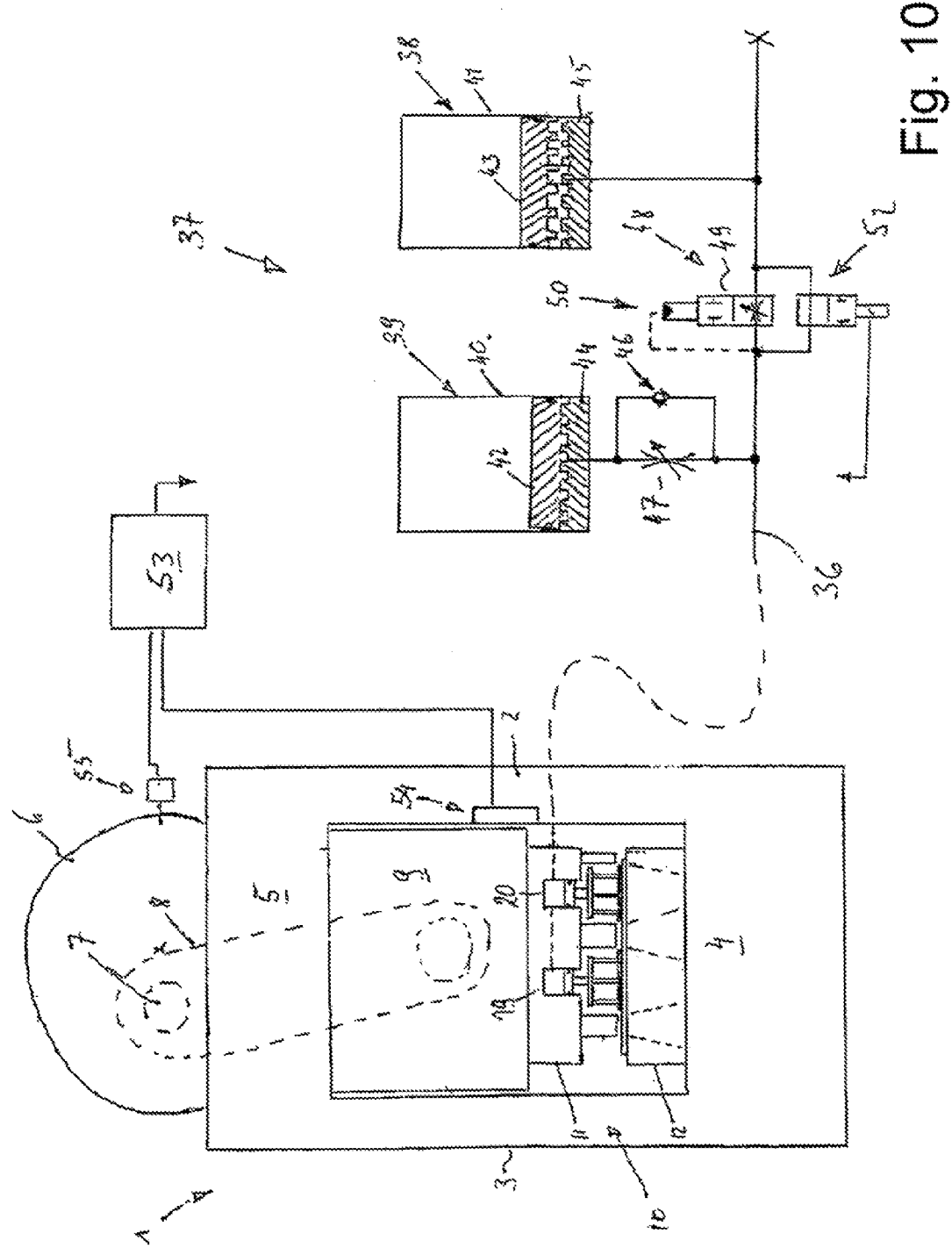
FIG. 10 shows the press according to the invention in a schematic overview illustration.
Figure 11:
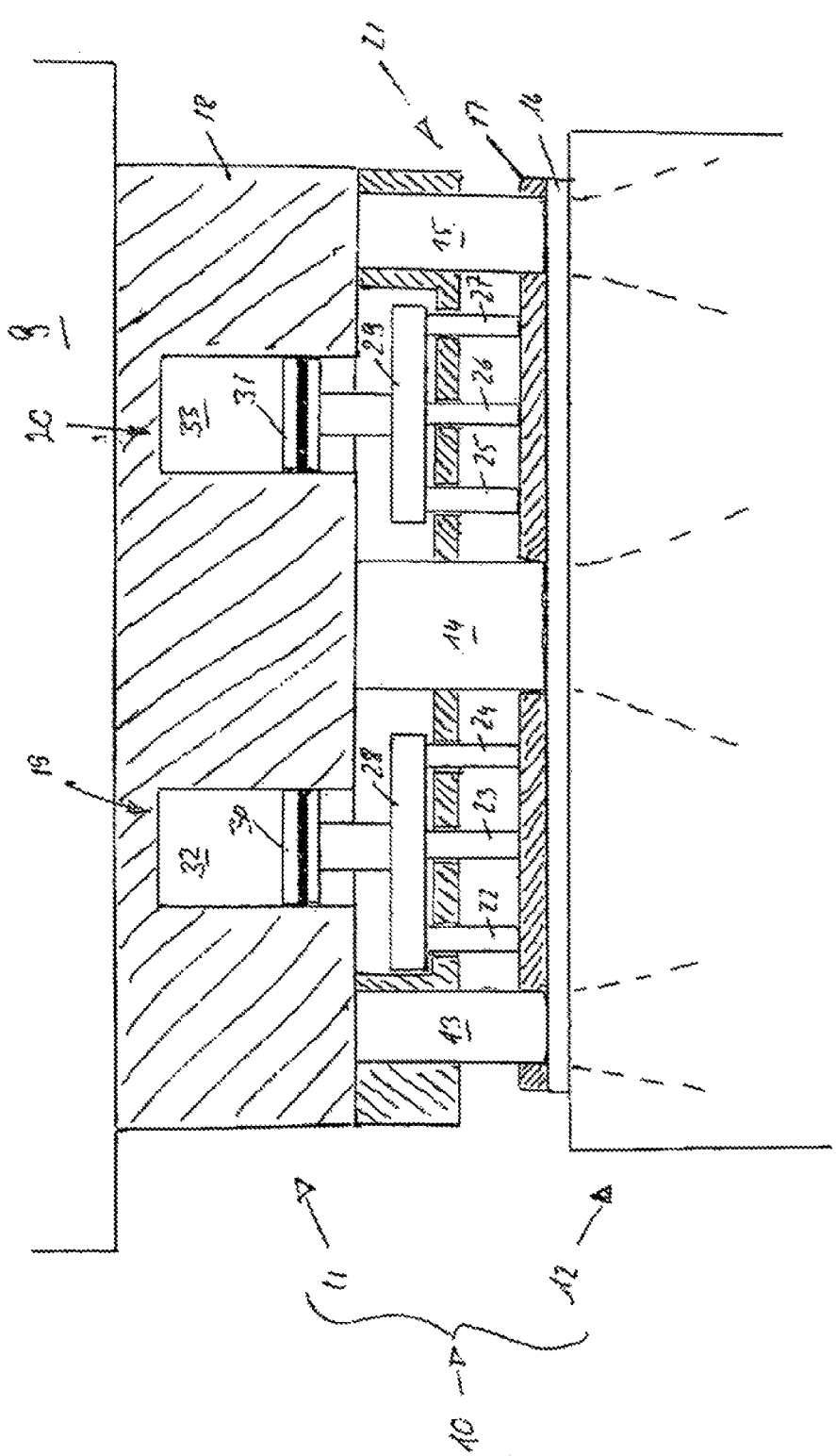
FIG. 11 shows the tool of the press according to FIG. 1 in a schematic, vertical cross sectional illustration.

In FIGS. 10 and 11, in a highly schematic illustration, a press 1 is depicted, which has a press structure with press supports 2, 3, a press table 4 and a head piece 5. To the head piece 5, a drive 6, for example, in form of an electric motor, is mounted, which drives a back and forth moving push-rod via a schematically and in dashed lines depicted eccentric 7 and a crankshaft 8, as well shown in dashed lines. Between the push-rod 9 and the press table a tool 10 is provided having an upper tool 11 and a lower tool 12. The lower tool 12 is configured as a punching tool. The upper tool 11 holds dies 13, 14, 15, which are shown in particular in FIG. 11, just like the other details of the tool 10. The tool 10 is for punching a workpiece 16, which is shown in FIG. 11 as a flat workpiece. Of course, non-flat workpieces can in a corresponding manner be subjected to a punching process as well. In this case, then, the lower tool 12 has a contour that corresponds to the non-flat workpiece.

A sheet metal holding plate 17 belongs to the upper tool 11 that is held by a basic body 18 of the upper tool 11 by means not shown in detail. The basic body 18 connected to the push-rod 9 carries the dies 13 to 15, so that they are rigidly connected with the push-rod 9. The basic body 18 has further one or more hydraulic cylinders 19, 20, which together with the sheet metal holding plate 17 form a sheet metal holding apparatus 21. To the sheet metal holding apparatus 21 belong further pressure pins 22 to 27, which are arranged substantially or precisely parallel to the dies 13 to 15 and rest with their lower frontal end on the sheet metal holding plate 17. The remaining substantially cylindrical pins, at their upper frontal ends, are supported by suspended intermediate plates 28, 29, which therefore rest on top of the pressure pins 22 to 27. The hydraulic cylinders 19, 20 have pistons 30, 31, which limit and seal in the hydraulic cylinders 19, 20 working volumes 32, 33 filled with hydraulic fluid, and which are movably mounted therein. Piston rods 34, 35 of the pistons 30, 31 press from above against the suspended intermediate plates 28, 29, and thereby the sheet metal holding plate 17 against the workpiece 16.

The hydraulic cylinders 19, 20 are via a fluid line 36, which is not shown FIG. 11, but schematically illustrated in FIG. 10*a*, *b*, connected to a hydraulic system 37, which is for generating a force of the sheet metal holder and taking over the force exerted by the push-rod 9 during and after the breakthrough of the workpiece 16. This transfer of a force has to occur, if possible, in a steady manner, i.e., without stepwise changes of force.

To the hydraulic system 37 belong a first pressure accumulator 38 and a second pressure accumulator 39, which are both configured in one embodiment as pressure accumulator cylinders 40, 41 with pistons 42, 43 sealed and movable mounted therein. Both pistons 42, 43 divide in the pressure accumulator cylinders 40, 41 two working chambers each, whose upper ones are each filled with gas. The pressure accumulator 38 is, for example, under a pressure of about 200 bar while the pressure accumulator 39 is, for example, under a pressure of 400 bar.

The pistons 42, 43 have on their bottom side, respectively facing the connecting pieces 44, 45, preferably a profile structure that is configured to be complementary to a profile structure of the respective connecting piece 44, 45.

The profile structure is formed by straight or curved, for example, ring shaped concentric ledges or rails, wherein the ledges or rails of each piston 42, 43 fit into correspondingly shaped recesses of each connecting piece 44, 45. The profile structures serve as end point dampening so that the pistons 42, 43 are softly slowed down when approaching the connecting pieces 44, 45.

Both pressure accumulators 38, 39 are connected with the fluid line 36. The pressure accumulator 39 is preferably connected with the fluid line 36 via a check valve 46 and a throttle device 47. The check valve 46 is thereby positioned so that the hydraulic fluid can flow undisturbed from the hydraulic line 36 into the pressure accumulator 40, while being forced through the throttle device 47 on its way back.

The pressure accumulator 38 is connected with the fluid line 36 via a valve device 48, and, hence, with the hydraulic cylinders 19, 20. The valve device 48 contains, e.g., a directional control valve 49 that can be switched between two states. In a first state, it passes the fluid flow in and out of the pressure accumulator unlimited or throttled, while it blocks this fluid flow in its other state. The valve device 48 can be connected with a sensor device 50, which monitors, for example, the mass flow m' in the fluid line 36, and interrupts it as soon as the hydraulic flow into the pressure accumulator 38 exceeds a threshold value $m_{th}$, and keeps it closed until the pressure in the fluid line 36 falls below a threshold value.

The sensor device 50 forms therefore at the same time a control unit 51 for controlling the valve device 48 depending on the speed of the relative movement between the pistons 28, 29 of the hydraulic cylinders 19, 20 and the push-rod 9.

A bypass valve 52, which bypasses the valve device 48 and, hence, provides for an alternative path from the hydraulic cylinders 19, 20 to the pressure accumulator 38, may, as needed, belong to the valve device 48. The bypass valve 52 is, for example, an open/close valve that can be controlled in an electric-pneumatic manner, or else. It is therefore preferably connected to a control apparatus 53, which can be preferably configured as microcontroller or other suitable electronic controller. Besides other input signals, the control apparatus 53 receives at least one position signal. This may be caused, for example, by a sensor 54, which detects, as a displacement sensor, the position of the push-rod 9, in particular in proximity of its lowest end point. In addition, or in the alternative, a sensor 55 can be provided that measures the angle position of the eccentric shaft at least in one angle of rotation range, in which the push-rod 9 is in proximity of its lower end point.

Figures 13, 14:
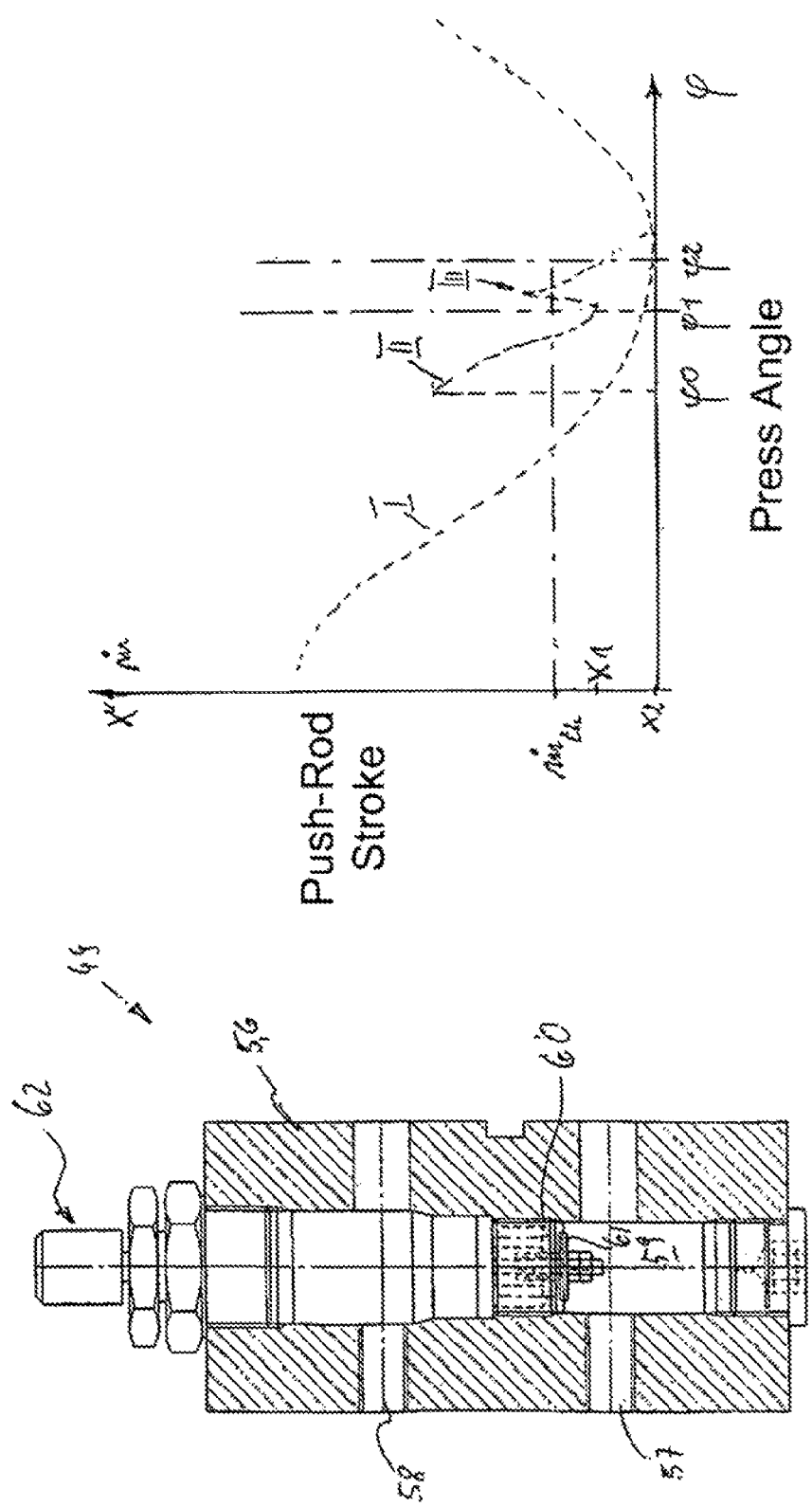
FIG. 13 shows a valve for monitoring a flow of a hydraulic fluid generated by the tool according to FIG. 2.
FIG. 14 shows diagrams illustrating the dependence of the push-rod stroke from the press angle, as well as the mass flow of the fluid flow displaced from the sheet metal holding apparatus from the push-rod stroke.
Figure 15A:
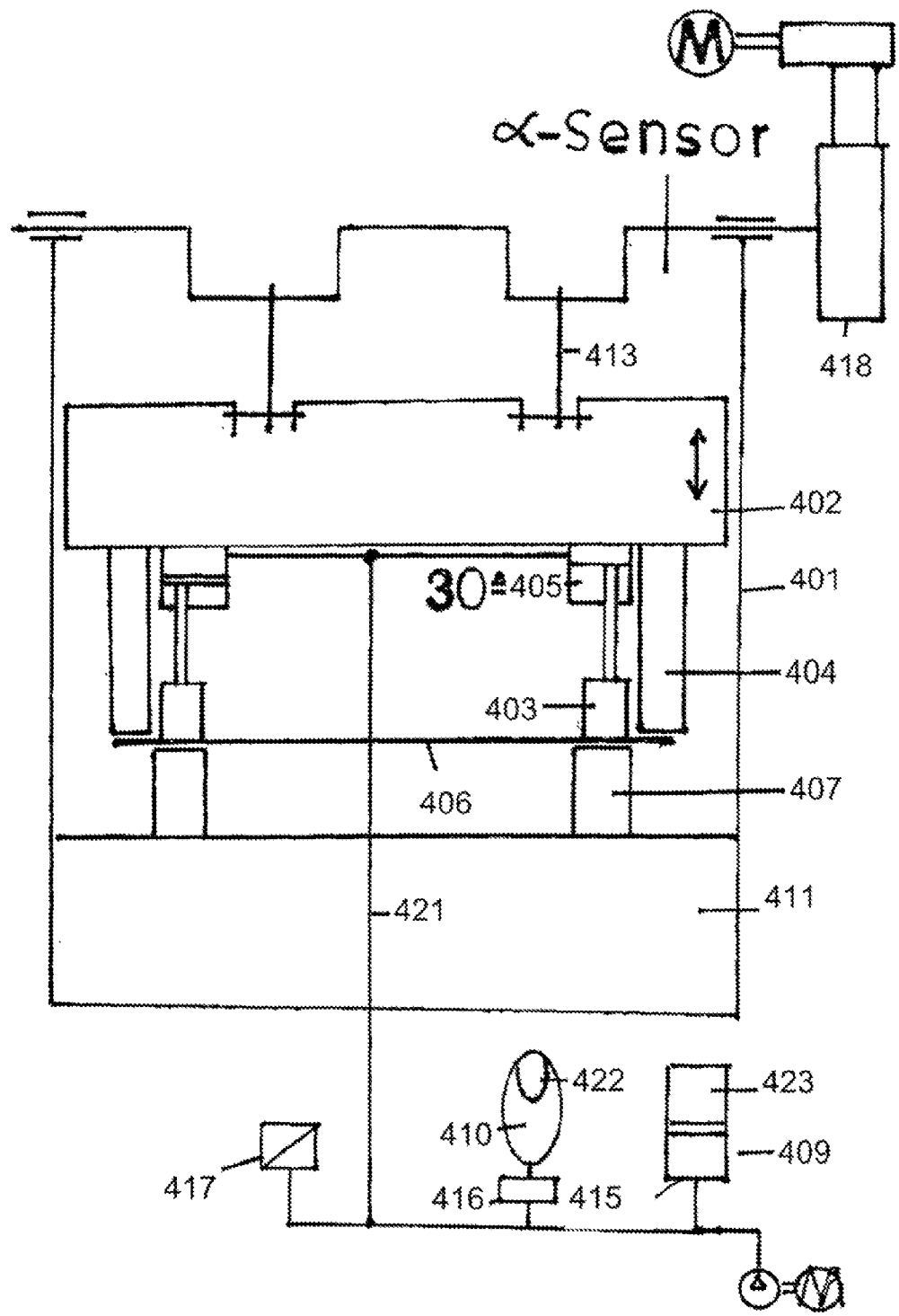
FIG. 15 & B illustrates a press.
Figure 15B:
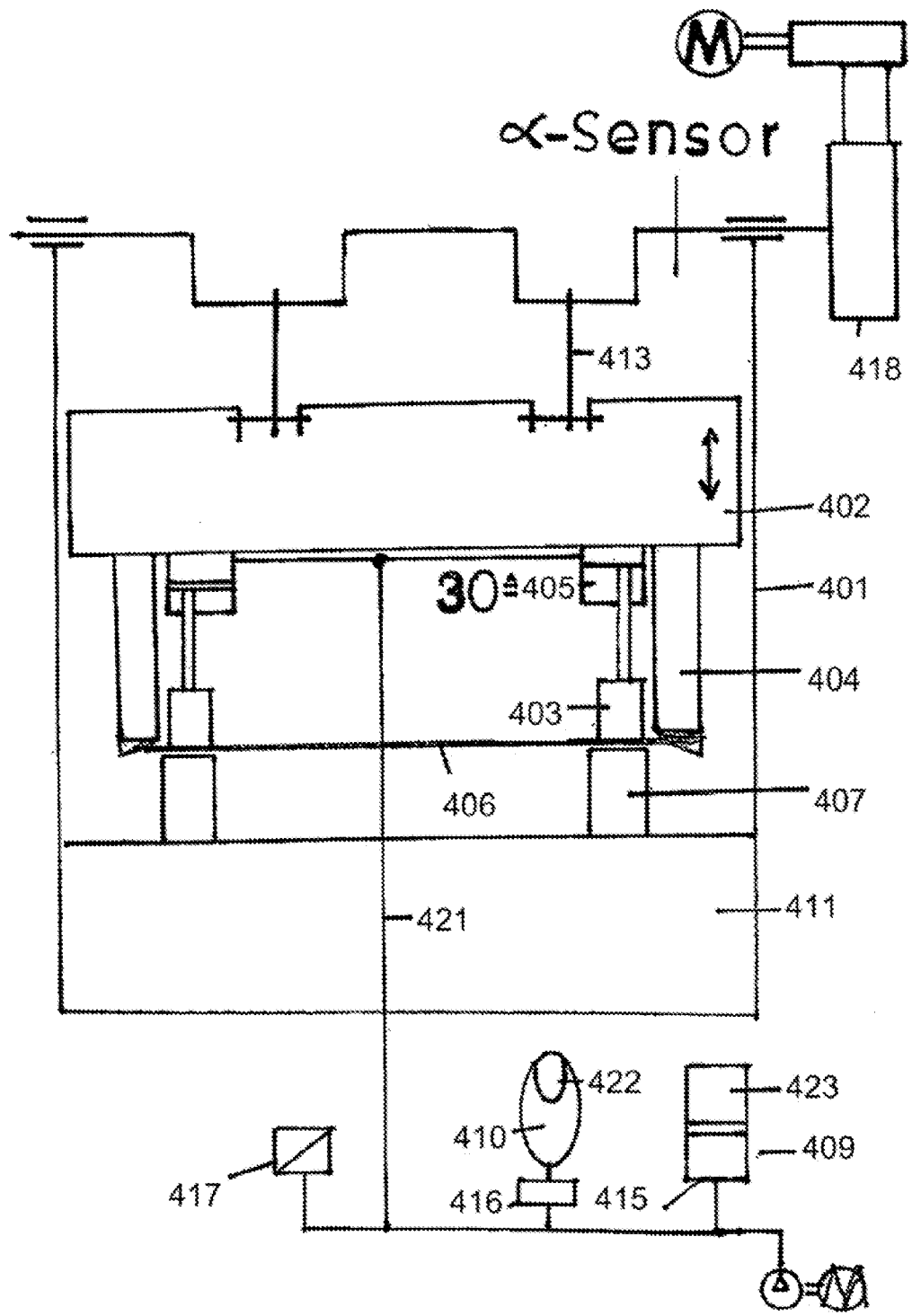

FIG. 13 illustrates one embodiment of the valve device 48, which is preferred because of its fast reaction time. It has a base 56 having at least one input 57 and one output 58. Between them, a channel 59 is formed that extends longitudinally through the base 56, and that is transverse to the channels of the input 57 and the output 58. Between the input 57 and the output 58 a valve seat 60 is formed, to which a valve end member in form of a disc 61 is assigned. The latter one sits on a pin and is biased in an opening direction away from the valve seat 60 by means of a spring. The bias can be adjusted, if needed, by means of a handle accessible from the outside, for example, an adjustment screw 62.

The press 1 described so far operates in a first simple embodiment that functions generally without the control apparatus 53, as follows:

For the illustration of the function a single punch stroke is described. For its performance, the workpiece 16 is first placed on the lower tool 12, and, then, the push-rod 9 is lowered. The sheet metal holder plate 17 is thereby in its lowest position, in which its lower side is at least a bit below the front surfaces of the dies 13, 14, 15. Before the sheet metal holder plate 17 touches the workpiece 16 the pistons 30, 31 in the hydraulic cylinders 19, 20 do not move. The hydraulic fluid in the hydraulic system 37 is under a static pressure.

As soon as the sheet metal holder plate 17 touches the workpiece 16 it presses the workpiece 16 against the lower tool 12. The sheet metal holder plate 17 comes to a rest while the push-rod 9 moves further towards the workpiece 16. Further, the pressure pins 22 to 27, the suspended intermediate plates 28, 29 and the pistons 30, 31 come to a rest. Following the further downward movement of the push-rod 9 the volume of the working chambers 32, 33 is reduced, and the hydraulic fluid is forced via the fluid line 36 and the open directional control valve 49 of the valve device 48 into the pressure accumulator 38, which has a lower static pressure than the pressure accumulator 39. Hence, the piston 43 in FIG. 1 is moved upwards against the force of the upper gas cushion. The resulting fluid flow m' is below a threshold value so that the sensor device 50 is not activated.

Then, the front surfaces of the dies 13, 14, 15 touch the workpiece 16. The workpiece 16 puts up a substantial resistance against the penetration of the dies 13, 14, 15, so that the movement of the dies 13, 14, 15 stops at first. The drive power of the drive device 6 is then temporarily used to elastically deform, i.e., tension, the power train and the press structure together with the press table 4 and the lower tool 12. Thereby, more and more an increasing force is built up until the dies 13, 14, 15 finally break through the workpiece 16. At the time of the break through a very fast relative movement between the base 18, and, hence, the hydraulic cylinders 19, 20, and the sheet metal holder plate 17 results. This leads to a short-term, very strong increase of the mass flow m' of the hydraulic fluid from the hydraulic cylinders 19, 20 into the pressure accumulator 38. The increase is so steep that the sensor apparatus 50 detects it and closes the directional control valve 49. In the embodiment according to FIG. 13, this means that the fluid flow, which flows from the input 57 to the output 58, takes the disc, i.e., the valve closure element 61, with it and presses it against the spring force against the valve seat 60. The directional control valve, therefore, closes suddenly, whereby the closed state is maintained until a decreasing system pressure allows the valve closure element 61 to return to its open state, i.e., static position.

Is the directional control valve 49 closed no additional hydraulic fluid can flow into the pressure accumulator 38. Therefore, it needs to give way into the pressure accumulator 39, which is at a substantially higher pressure. Hence, the hydraulic cylinders 19, 20 cause a substantial counter pressure that acts, on one hand, upon the sheet metal holder plate 17, and, on the other hand, counters the push-rod 9. Thus, the force up to now absorbed by the dies 13, 14, 15 is transferred to the sheet metal holding device 21 so that the tensioned press cannot relax. Against the strong force of the sheet metal holding device 21 the push-rod passes through its lower dead point, wherein the sheet metal holding device pushes the push-rod 9 with great force upwards during the first section of the upward stroke. In this phase, the elastic energy stored in the press 1 is transferred to the push-rod 9, and, hence, returned to the drive apparatus 6.

A more elaborate embodiment uses the control apparatus 53 for controlling the sheet metal holder device or an alternative support device, for example, in form of hydraulic cylinders between the push-rod 9 and the press table 4, or the upper tool 11 and the lower tool 12. The control apparatus 53 monitors the position X of the push-rod 9 or the rotational angle $\phi$ of the drive apparatus 6, i.e., the eccentric 7. The relationships are illustrated in FIG. 14. Thereby, a press with a high stroke number is assumed. A first graph I illustrates the path X of the push-rod 9 over the rotational angle $\phi$ of the eccentric shaft. An approximately sinusoidal relationship is assumed. With a press angle $\phi 0$, the sheet metal holding plate 17 touches the workpiece.

The graph II illustrates the mass flow of the hydraulic fluid displaced from the hydraulic cylinders 19, 20. As can be seen, it increases stepwise to a relatively high value when the sheet metal holding plate 17 touches the workpiece 16. When the push-rod 9 approaches its lower dead center the mass flow m' continues to decrease further. This is because the speed of the push-rod 9 decreases when approaching the lower dead center. As a consequence of the resistance the material of the workpiece 16 puts up against the punching process, the push-rod 9 is further slowed down, whereby the mass flow strongly decreases according to graph II.

At a press angle $\phi 1$, which exists with certainty after the sheet metal holding plate 17 touches the workpiece 16, and with certainty before the break through of the dies 13, 14, 15 through the workpiece 16, the control device 53 closes the bypass valve 52 activating the sensor device 50. Instead of the crank handle or press angle $\phi 1$ the push-rod 9 passing through the point x1 can be used as a criterion for releasing the sensor device 50 and the valve device 48. However, monitoring the press angle is preferred because it provides a better resolution.

If, after activation or release of the sensor device 50, or after passing through $\phi 1$, the break through of the workpiece 16 occurs, the fluid flow m' exceeds a threshold value $m'_{th}$. This is illustrated in FIG. 14 by means of the tip III in graph II. An exceeding of the threshold value of the fluid flow is detected that leads to the closure of the valve device 48, as described above, and, hence, to the support of the push-rod 9 on the sheet metal holding device 21.

As can be seen in FIG. 14, by defining the activation window between the press angles $\phi 1$ and $\phi 2$ it can be achieved that flow peeks are detectable that are lower than the flow immediately after the sheet metal holder plate 17 touching the workpiece 16. This plays a roll with very fast presses (high stroke numbers), large punch strokes, and, in particular, very stiff press structures, in which a very high tension force, but only a low tension change occurs in the whole press structure. Due to the limitation of the monitoring of the fluid flow to an angle window $\phi 1$, $\phi 2$ of the press drive, within which the break through is to be expected, the activation threshold $m'_{th}$ for the valve device 48 can be set very low so that the otherwise noticeable punch is limited to a barely noticeable minimum.

Instead of the sensor device 50, which monitors the fluid flow from the hydraulic cylinders 19, 20, other sensor device can be used as well. Further, it is possible to define the press angles $\phi 1$, $\phi 2$ variably. For example, they may be entered by means of a suitable input device. It is further possible to adjust these press angles $\phi 1$, $\phi 2$ dynamically. This can be done, for example, by setting $\phi 1$ to an angle distance before the breakthrough that is predetermined or can be input, and $\phi 2$ to an angle distance after the breakthrough that is fixed or adjustable. As press angle of the break through the respective press angle of the previous punch stroke, or an average of previous punch strokes is used. It is also possible to provide the press structure, the press table or other parts of the press with force sensors, which react in response to a deformation of the respective press element, or directly to the force acting upon the press. For example, these may be force sensors in the tool 10. The signals generated by these sensors can be fed to the control device 53 and can be used to define the press angles $\phi 1$, $\phi 2$. Is, for example, the force acting upon the dies 13, 14, 15 detected, the sensor device 50 can be released at a moment, i.e., then released, when a significant increase of force is detected at the dies 13, 14, 15. At this moment, no erroneous release of the valve device 48 is to be worried about because the relative movement between the sheet metal holding plate 17 and the dies 13, 14, 15 is close to zero.

The system according to the invention provides for a substantial increase of the holding-down force, in particular during the performance of the punching, i.e., while the dies 13, 14, 15 penetrate through the material of the workpiece. The actual cutting force can thereby be reduced up to a sixth of the theoretical shear force. The sheet metal holding device 21 causes a particular strong clamping of the workpiece 16, and, hence, causes an improvement of the cut and a dampening of the cutting punch as well. The press 1 is biased so that plays are balanced or compensated. With respect to conventional systems for dampening the cutting punch, this leads to a reduction of the total press force of the system. This means further that older presses can continue to be used even for difficult separation tasks.

The force exerted on to the sheet metal holding plate is preferably set to 40% of the press force. The separating process can be monitored, evaluated and controlled by means of the use of a fast evaluation and control device, such as the control device 53. The system can essentially be configured and used to be autarkic, i.e., independent of the press 1. For example, it can be part of the tool, and, hence, used in principle with different presses. When changing the press data, press specific parameters can be changed by means of a program or system specific flash cards.

The pressures in the hydraulic cylinders 19, 20 can be permanently monitored depending on the encoder or path. The resulting envelopes allow a permanent monitoring of the process. The control of the bypass valve 52 occurs shaft-angle dependent or path dependent via the same system. The process data and failures can be stored by means of data storage systems and tracked back in case of damage. Further, systems for detecting overloads can be provided.

To improve the cut quality, in particular when punching high tensile, austenitic materials or thick sheet metals, a sheet metal holding device 21 is provided that rigidly clamps the respective workpiece 16 during the punching process. The tension force is increased up to 40% or more of the force of the push-rod. In particular, the force exerted by the sheet metal holding device can be increased during the breakthrough of the workpiece. On one side, the cut quality is thereby improved while on the other side an efficient dampening of the cutting punch at the press results.

The apparatus is in particular for avoiding the cutting punch during the breakthrough through the workpiece.

When cutting sheet metals the press deflects. That is, with hard sheet metals, due to the release of the cutting energy the total deflection is transformed into oscillation energy. This leads in particular with hard sheet metals or sheet metals of higher strength, as used in the future in particular in vehicle construction, to an early destruction of the components of the installation. The braced frame and the components connected therewith: eccentric shaft, flywheel mount, crankshaft, push-rod, table, tools, guides, tie-rod, base, threading dies, die plate are extremely in danger due to the rapid relaxation.

State of the art: With cutting punch cylinders oil is sprayed over throttles or pressure limiting valves after the setting down or during the breakthrough. The energy released thereby is completely transformed into heat. It is a disadvantage that energy is thereby wasted. In addition, a holding down device is required that presses the sheet metal against the die plate so that it does not bend towards the threading dies. This leads to an additional increase of the press force.

An advantage of the new invention is that the holding down device acts at the same time as an absorber of the cutting punch. The deflection energy is only stored temporarily in the high pressure accumulator. The holding down cylinders serve at the same time for maintaining the pressing force constant. The deflection energy is controlled so that it does not lead to an oscillation of the press. The characteristic curve of the deflection and unloading is manipulated from one of a cutting press to one of an embossing press. It is an advantage thereof that the deflection energy of mechanical presses is fed back to the flywheel. With hard sheet metals about 50% of the cutting force is required for the holding down force. With these cutting methods about 60% of the ancillary forces can be avoided. The conventional dampening of the cutting punch requires about 60% of the press force as counter force; 50% of the cutting force as holding down force. If the cutting die broke through the workpiece the high pressure counters via the nitrogen biasing. That means that the maintenance of a constant pressing force acts against the pressing force only when the workpiece already broke through. This does not act as an increase of the pressing force. Assuming that because of high tensile or ultra-high tensile sheet metals—strength about 1200-1900 N/mm2—the pressing force will in the future increase 4-5 fold, it will be necessary to household with the force.

DESCRIPTION OF THE INVENTION

FIG. 15

A press having a flywheel is driven by one or more motors. Via a clutch and eccentric drive the push-rod is, via one or more con-rods, moved towards the table in nearly parallel manner. At the push-rod, preferably the cutting tool with a holding-down device is provided. The holding-down device provides that the sheet metal does not deflect during the cutting process. The cylinder piston acting upon the holding-down device holds the sheet metal. The holding down device/piston is biased by means of the low pressure accumulator, or the oil exerts via the nitrogen compression via the oil a predetermined holding down force on the holding-down device. The adjustment occurs via the nitrogen loading pressure at the store. This one can also be biased by the spring force/piston unit. If the sheet metal breaks through the flow valve closes. This valve is preferably provided with a low-mass punch plate. For maintaining the pressing force constant the break through is controlled. The controlled break avoids the relaxing of the base and the elements connected therewith, such as the deflection of the table, push-rod deflection, con-rod deflection. After passing through the lower dead center, the compressed energy of the high pressure accumulator is fed back to the flywheel via the holding down cylinder. The Jetcon valve serves as fast-switching valve with flow limitation.

401 Press, body
402 Push-rod
403 Holding-down device
404 Cutting edges, cutting knives
405 Holding-down cylinder
406 Sheet metal, workpiece
407 Die plate, lower cutting edge
408 Oil supply, pump, motor, pressure limiting switch
409 High pressure piston storage with end dampening
410 Low pressure storage
411 Table
412 Press frame
413 Crankshaft
414 Connecting line
415 End dampening within the hydraulic storage high pressure
416 Flow valve, jetcon valve
417 Pressure switch
418 Flywheel
419 Main motor
420 Drive belt
421 Oil, fluid
422 Nitrogen, low pressure
423 Nitrogen, high pressure
424 Set back die 1
425 Set back die 2

In the apparatus for the cutting of workpieces with a low cutting punch, one or more holding down cylinders act at the same time as counter holders, wherein the deflection energy is fed from the stores back into the drive, wherein the Jetcon valve is actively pre-activated. The punch plate of the Jetcon valve is made of a light-weight, high-tensile material. The holding down cylinders are used for the parallel holding.

Figure 17:
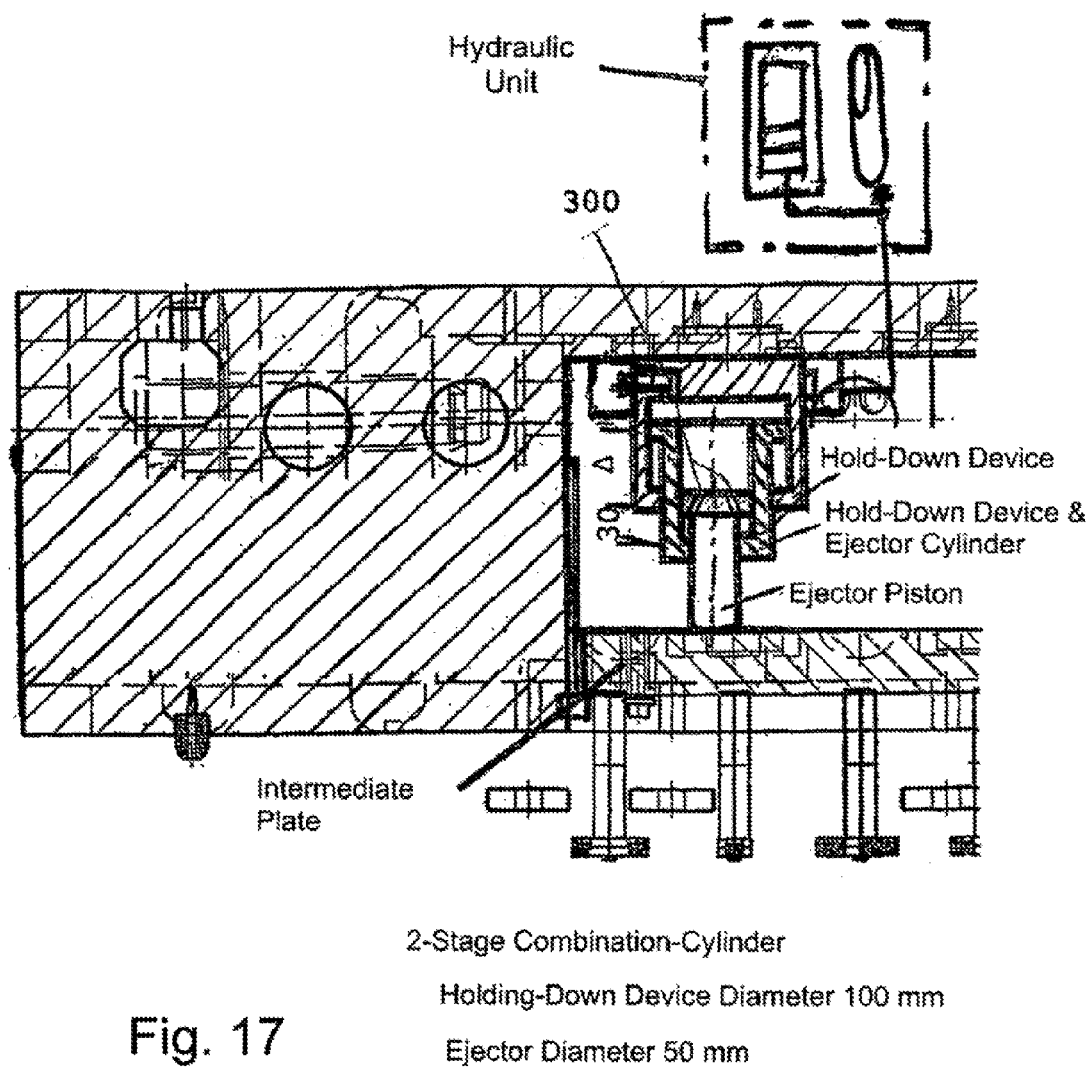
FIG. 17 illustrates a support for a tool.

FIG. 17 shows a support for a tool having an intermediate tool plate and an upper tool plate. The holding-down device and the pressure maintaining cylinder 30, which is also shown in FIG. 11, acts as an ejector after traveling the distance delta (Δ), wherein the holding-down device requires therefore the oil channels 300. In FIG. 17, the holding down devices 30, which are also shown in FIG. 11, act also as ejectors by means of the oil overflow channels 300. The low pressure accumulator is used for controlling the off-mean pressing force. The feeding back is monitored via angular acceleration sensor in the flywheel.

FIG. 16 schematically illustrates a die 11, which has a so-called variable cutting gap (u1 ... u2) between the die 11 and die plate 3. The cutting gap varies between u1 and u2 between 2% to 10% of the sheet metal thickness, but preferably from 2% to 6%. At u1 the cutting gap is about 2% of the sheet metal thickness to be cut, and at u2—at the widest distance—the cutting gap is about 6% of the sheet metal thickness to be cut. As already mentioned in the Handbook of Deformation Technology (Springer Publishing, 1996, page 281) "a large cutting gap generally reduces the required force and effort." Therefore, the press or cutting force depends also from the cutting gap. In the manner shown in FIG. 16, by means of using the variable cutting gap, the press or cutting force can be reduced about one half. This variable cutting gap technique can be used for any geometry in that, as shown in the lower illustration of FIG. 16, the u1 ... u2 sections are arranged in segments around the circumference of the die 11. During cutting, using the variable cutting gap. the sheet metal to be cut is first cut around the u1 zones, wherein thereby caused cracks spread towards the u2 zones, which then leads to a—slightly delayed—complete cut. According to the above-mentioned Handbook, page 275, "a reduction of the required cutting force is possible, if instead of a die with even working surface a beveled, shearing cutting die is used." On page 276, a reduction of the cutting force by at least 30% compared to dies (die plates) with even surface is mentioned. In an alternative embodiment, the variable cutting gap is combined with the technique of the beveled die to achieve a further reduced cutting force. In particular, it is foreseen to bevel the areas starting from the u1 edges in x-direction to the u2 areas, which can be seen in the sideview of the die 11 in FIG. 16. In a further preferred embodiment, it is foreseen to clamp the sheet metal to be cut by means of the holding-down device 3 shown in FIG. 12 so that a notch is caused at the place of clamping. In this manner, the required cutting force is reduced by a factor of about 1.2 to 2.2. The so-called bending cutting or hard cutting shown in FIG. 3, wherein the lever 1 corresponds to the three to eightfold of the sheet metal thickness to be cut, preferably the six fold of the sheet metal thickness to be cut, is suitable for reducing the cutting force to about one sixth of previously known values. In a preferred embodiment it is foreseen to combine the previously described bending cutting or hard cutting with the equally above described technique of the variable cutting gap to reduce in this manner the cutting force to about one ninth of the known values. In a further embodiment according to the invention, it is foreseen to combine the variable cutting gap, the bending cutting or hard cutting and the pulling cut (slanted die) to reduce the cutting force to about one twelfth of the usual values "because the cutting force may not exceed the nominal pressing force mentioned on the power label of the press within the nominal operational path since this may cause the machine to be overloaded." (Handbook on page 274.) The initially set objective is solved by means of the above improvements. Q.e.d.

The invention claimed is:

1. A method of cutting high-tensile workpieces, wherein the workpiece is subjected to a bending stress prior and during a shearing process, wherein the bending stress causes a substantial component of a tensile force transverse to a desired cutting contour; wherein the workpiece is loaded with a bending moment, which causes a tensile stress at the cutting contour, and wherein the bending moment is caused by means of a projection provided at a cutting knife; wherein the projection is provided at a distance from a cutting edge of the cutting knife, and, when performing the shearing process, the projection hits the workpiece before the cutting edge; and wherein a distance a between the cutting edge and the projection and a height h of the projection have a ratio a/h determined by a thickness d of the workpiece and a constant k, as follows:

$$a/h = k*d,$$

wherein k has a selected value between 0.8 and 6.

2. The method according to claim 1, wherein the high-tensile workpieces comprise sheets of martensite steel.

3. The method according to claim 1, wherein the workpiece is clamped at a side of the cutting contour to be generated between a support surface and a workpiece holder.

4. The method according to claim 3, wherein a holding force is so strong that a tensile stress caused by the bending stress is absorbed by the workpiece holder immediately at the cutting contour.

5. The method according to claim 1, wherein a tensile stress introduced to the workpiece is set to be close to a flow limit of the respective material of which the workpiece is made.

* * * * *